Oct. 26, 1954     J. L. DUNNIGAN     2,692,585
COMBINED COOLING AND FUEL ECONOMIZER
Filed Oct. 21, 1952
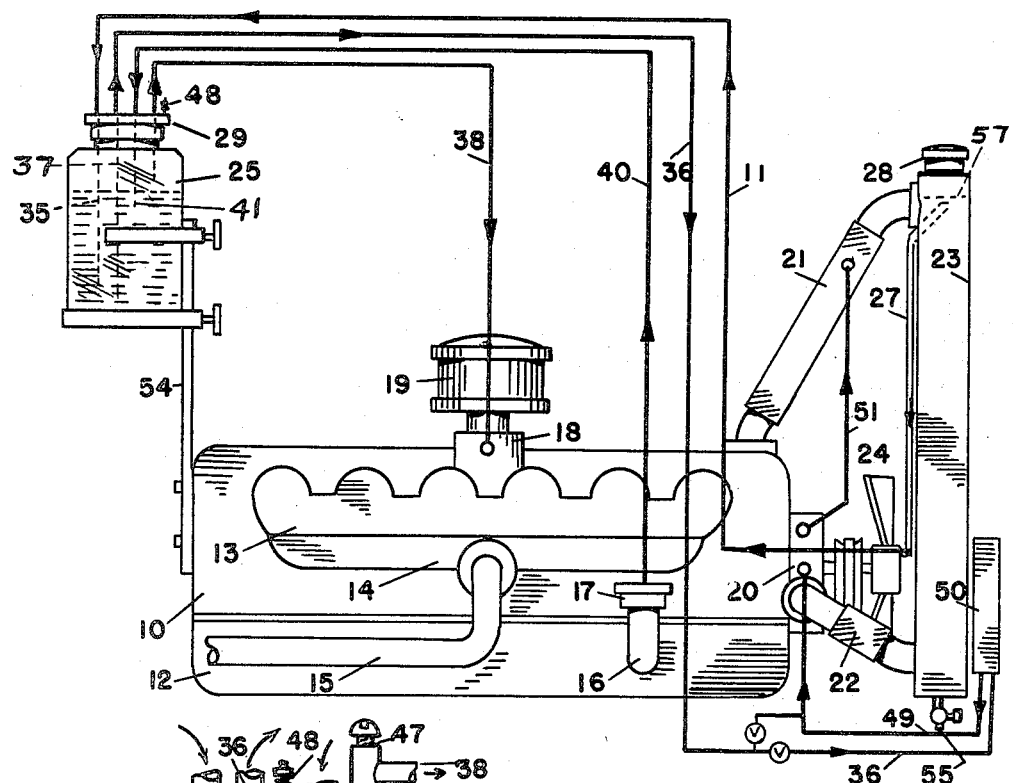
Fig. 1.
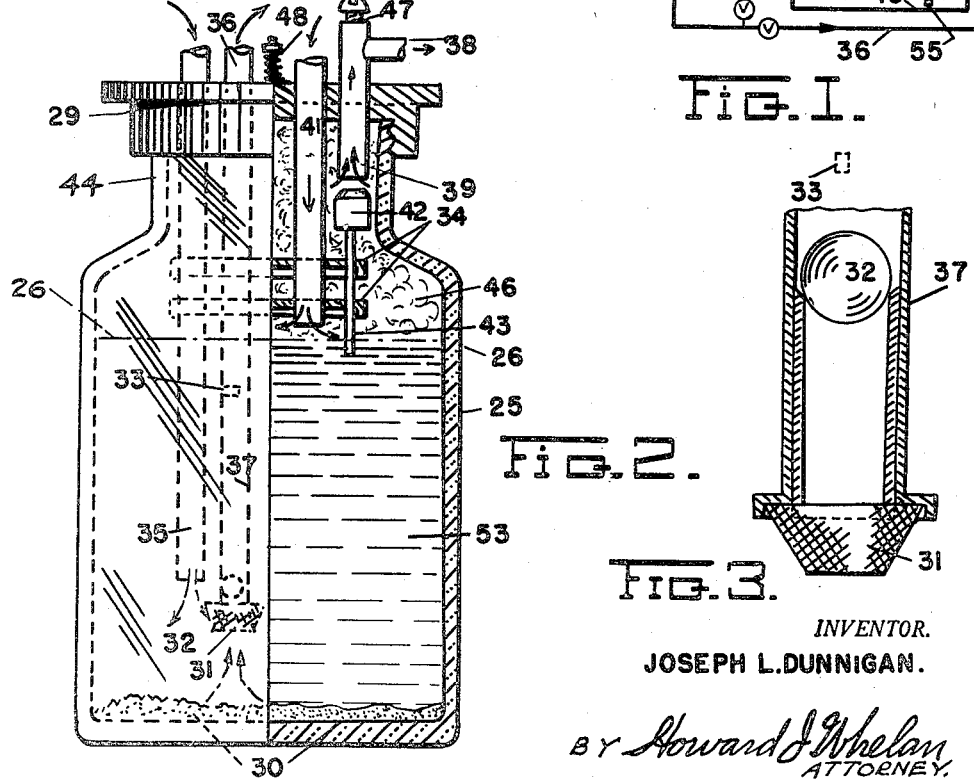
Fig. 2.
Fig. 3.
INVENTOR.
JOSEPH L. DUNNIGAN.
BY *Howard J. Whelan*
ATTORNEY.

Patented Oct. 26, 1954

2,692,585

UNITED STATES PATENT OFFICE 2,692,585

COMBINED COOLING AND FUEL ECONOMIZER

Joseph L. Dunnigan, Baltimore, Md.

Application October 21, 1952, Serial No. 315,916

9 Claims. (Cl. 123—25)

This invention relates to internal combustion engines and more particularly to the type that employs liquid in a closed system of cooling piping and radiators for maintaining a safe temperature in the water jacket and other incidental portions of the engine.

In a closed cooling system for an internal combustion engine, where water is used as the coolant difficulty has been experienced in preventing excessive pressures developing as the water is turned to steam by the heat of combustion of the fuel used in the engine. Steam under pressure in such a system tends to cause leakage of the coolant through any weak spots in the engine parts, piping or radiators. When the engine is stopped and cooled off, the resulting effect is in reverse and produces a vacuum action in the system that tends to draw air into it. This air has to be removed from the system when the engine is started again or it may cause air bubbles or slugs that interfere with the circulation of the water and may allow the cylinders, where the explosions take place, to become scorched, distorted or warped. In addition steps have to be taken to refill the amount of liquid lost when it lowers the level of the liquid dangerously. No provision is usually made to eliminate the grit and rust in the system, so that eventually these items affect the efficiency of the system. In this invention an extension of the system is included, which employs piping leading to a common clearing unit or container wherein the coolant is intercepted and serves as an automatic control of the liquid level in the system as well as an arrangement for removing dirt, and utilizing the oily vapors arising from the crank case, to improve the operation of the engine.

The invention includes among its objects to provide a new and improved closed cooling system for an internal combustion engine that will avoid one or more of the limitations and disadvantages of the prior art.

Another object of the invention is to provide a new and improved closed cooling system for an internal combustion engine that will give an effective distribution of the coolant and condense its steam before its pressure becomes excessive, and to provide a filter arrangement that will keep it relatively clean and segregate the water, oil, steam and sludge for the best results in the use of the system.

Still another object of this invention is to provide a new and improved closed cooling system for an internal combustion engine that will automatically vent excessive air from the system, when under pressure and adjust the liquid level to keep its circulation working effectively.

An additional object of the invention is to provide a new and improved closed cooling system for an internal combustion engine that can be visually examined and otherwise tested for faults and defects in the system and various parts of the engine.

Other objects of the invention will become apparent as it is more fully described.

For a better understanding of the invention, its objects, principles and operation, reference is made to the drawings included in this application by way of example, and the explanation afforded by the specification and the scope indicated by the claims.

In the drawings:

Figure 1 is a diagrammatic view of an internal combustion engine cooling system embodying this invention;

Figure 2 is an elevation partly in section of the segregating unit or container used in this embodiment; and Figure 3 is a sectional detail of the stub on the outflow pipe showing the check ball structure.

Similar reference numerals refer to the same parts throughout the drawings:

In the construction indicated, the general layout of an internal combustion engine of the conventional reciprocating type is shown in the drawings. The engine block 10 is supported on a suitable foundation or chassis not shown with the crank case 12 extended below. Its intake manifold 13 leads to the combustion chambers of the cylinders with exhaust manifold 14 leading to the exhaust pipe 15 and thence to the atmosphere. An oil filler filter tube 16 is connected at the side of the crank case 12 and has a breather cap 17 covering it. The carbureter 18 is attached to the intake manifold 13 and distributes the liquid or vaporized fuel to the cylinders and has a conventional air filter 19 mounted on it. In front of the engine is a water pump 20 with hoses 21 and 22 for circulating the coolant to the upper and lower portions respectively of an automobile radiator 23. A fan 24 serves to draw air through the radiator 23 while the engine is running. The radiator 23 is normally filled to the level line 57 where an overflow pipe 27 ordinarily carries off the excess fluid to the outside. In this case it is made part of the closed system. The radiator has a cap 28 which can be screwed closed to prevent the water or steam from escaping through it while the system is being used according to this invention.

The components of the cooling system used in this invention, consists of a transparent segregating bottle or container 25 of suitable shape and size. It is more or less of elongated form and has a screwed-on cap 29 hermetically secured to its neck 44. This cap 29 is preferably flat on top and arranged with unions for respectively coupling the radiator overflow pipe 27 and piping 11 to the stub 35, in the bottle; an outflow pipe 36 to the pump and to its stub 37 in the bottle; a manifold tubing 38 to the restrictor valve 39; and a flexible breather tubing 40 from the breather cap 17 to the short stub 41 in the bottle. The stub 41 terminates in the air space of the bottle or container.

The stub 35 is long enough to reach to a point close to the bottom of the bottle and flow its contents into the latter. It tends to deposit the heavier particles of dirt in its liquid in a pile, as sludge 30 at the bottom of the bottle. The outflow stub 37 is placed with its opening covered with a filter screen 31 close to the mouth of the stub 35. This screen is mounted in the stub 37 and can be closed by a check ball 32 to prevent back flow into the bottle. A pin 33 located in the stub 35 limits the vertically upward travel of the ball 32. Baffle plates 34 are suspended horizontally on the stubs 35, 37 and 41 to prevent splashing of the liquid and steady the stubs. A float 42 has a stem 43 guided in holes in the baffle plates, vertically. This float closes the restrictor valve 39 when the liquid in the bottle gets too high. The crank case or filler tube connecting pipe 40 empties into the air space 46 above the normal water level line 26 in the bottle and thus deposits air, oil and steam into it without passing same through the water below. The restrictor valve 39 has a screw 47 for adjustment provided on it. Also a spring actuated vacuum valve 48 is installed in the cap 29 to take care of a vacuum developed in the system.

The water pump 20 has a connecting pipe 51 or thermostat bypass leading to the hose 21. An auxiliary or booster radiator 50 is connected to piping 36 and condenses the steam received from the container 25 and passes the liquid through pipe 49 to the water pump 20. Valves 56 are used to by-pass the auxiliary radiator 50 when it is not needed. The purpose of this auxiliary radiator is to augment the functions of the main engine radiator 33. It is preferably located under the hood space of the engine so that it can dissipate its heat independently of the radiator 23.

In the operation of the system, the engine is started and runs with its pump moving the water or liquid column of the radiator 23 through the water jacket of the engine in a conventional manner and a certain proportion passes through the auxiliary radiator 50 and through its piping 36 and 49. The heated water rises in the radiator 23 and flows out through the overflow pipe 27 and pipe 11 and thence to the bottle 25 and through the stub 35, where it deposits the liquid and any grit, scale in it. The grit forms a layer of sludge 30 at the bottom of the bottle and is removed at convenient times. The coolant liquid 53 fills the bottle 25 to the approximate level line 26 marked on the wall thereof, and allows any entrained steam or air to collect above in the space 46. Rising water induces the float 42 to rise in it and close the restrictor valve 39 controlling the pipe 38. The closing of this valve shuts off the supply of moisture and vapor to the intake manifold 13 from the cooling system. The crank case 12 through its breather piping 40 supplies oily vapors to the bottle and exhausts them through its stub 41 into the air space 46, where they can condense to pass through the restrictor valve 39 when the latter is not closed. The mixture of oil, liquid fuel and water vapors pass into the combustion space of the engine and are used up in there doing work. If the steam passes into the air space and becomes excessive it flows through the piping 36 to the auxiliary radiator 50 and is condensed and taken up by the pump and fed to the cooling system through tubing 49, 51 and 21. The bottle is supported on a bracket 54 attached to the engine body 10 in any conventional manner.

The bottle being transparent and usually conveniently located enables the operator to observe what is going on in the cooling system, and when there is too much dirt in it warns that it is time to clean it out. The vapors from the breather tubing are used up in the engine instead of contaminating the atmosphere around the engine. They provide for a certain amount of lubrication at the valves of the engine and where gasoline is present it combines with the mixture from the carbureter.

In general the system affords a number of advantages. It keeps the steam pressure in the system under control yet allows the coolant to rise to the temperature of boiling water and provides a very efficient cooling system. The system works under pressure of the steam augmented by a vacuum that facilitates its pulling and circulating of the coolant. This prevents the radiator from leaking even if there are small holes in it. The connection to the manifold provides a continuous vacuum in the system and draws the hot water from the top of the radiator and any greases or rust in it, to the bottle. As liquid is taken out from the radiator through the overflow piping 27, other water or liquid replaces it from the circulation passing through the stub 37 and the tube 36.

While the engine is running the restrictor valve is closed by screwing down the adjusting screw 47 until closed. The restrictor valve is then opened gradually, until the engine indicates its highest speed and smoothest operation. Then adjust the idling adjustment back to normal idling speed, after which the system will operate automatically.

When the radiator requires more water, its cap is not removed, but the user removes the tubing 40 from the breather cap and submerges it into a supply of water or other coolant liquid. The vacuum of the system will draw liquid up into it and pour it into the bottle. When the liquid is at the proper level in the bottle at 26, the tubing is replaced on the breather cap 17. If the bottle is over filled in this process it will cause the float 42 to rise and close the restrictor valve 39 automatically and stop the filling. Liquid can then be drained out of the system by opening the pet cock 55 on the radiator and draining off enough water to lower it in the bottle and allow the float to open the restrictor valve. After that the system is ready for operation.

The system can be operated as described above. It can also be operated by closing the restrictor valve and detaching the connection 40 to the breather cap. This permits the system to operate without a vacuum acting on it. The system can be operated without the auxiliary radiator 50 and by passing it by using the by-pass and valves indicated at 56. This is not generally advisable in normal weather as it anticipates overheating of the engine when the auxiliary radiator is employed.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. A cooling system for an internal combustion engine including a radiator and pump and using a circulating liquid coolant, comprising in combination, a container of predetermined capacity for holding a portion of the liquid, connections between the radiator and the container and pump to form a path for the circulation of the liquid therethrough, means for controlling the flow of the liquid through the container in parallel with the normal circulating cooling system of the engine, said container being visually examinable for observing the amount of liquid therein.

2. A cooling system for an internal combustion engine including a radiator and pump and using a circulating liquid coolant, comprising in combination, a container of predetermined capacity for holding a portion of the liquid, connections between the radiator and the container and pump to form a path for the circulation of the liquid therethrough, means for controlling the flow of the liquid through the container in parallel with the normal circulating cooling system of the engine, said container being visually examinable for observing the amount of liquid therein, another connection connecting the container with the intake manifold of the engine for producing a vacuum action in the system and facilitating the operation of the system in the circulation of the liquid therethrough.

3. A cooling system for an internal combustion engine including a radiator and pump and using a circulating liquid coolant, comprising in combination, a container of predetermined capacity, for holding a portion of the liquid, connections between the radiator and the container and pump to form a path for the circulation of the liquid therethrough, means for controlling the flow of the liquid through the container in parallel with the normal circulating cooling system of the engine, said container being visually examinable for observing the amount of liquid therein, another connection connecting the container with the intake manifold of the engine for producing a vacuum action in the system and facilitating the operation of the system in the circulation of the liquid therethrough, and means for controlling the last mentioned connection.

4. A cooling system for an internal combustion engine including a radiator and pump and using a circulating liquid coolant, comprising in combination, a container of predetermined capacity, for holding a portion of the liquid, connections between the radiator and the container and pump to form a path for the circulation of the liquid therethrough, means for controlling the flow of the liquid through the container in parallel with the normal circulating cooling system of the engine, said container being visually examinable for observing the amount of liquid therein, another connection connecting the container with the intake manifold of the engine for producing a vacuum action in the system and facilitating the operation of the system in the circulation of the liquid therethrough, means for controlling the last mentioned connection, and another connection from the container to the breathing cap of the engine for enabling vapors therefrom to be brought to the container and distributed thereby.

5. A cooling system for an internal combustion engine including a radiator and pump and using a circulating liquid coolant, comprising in combination, a container of predetermined capacity, for holding a portion of the liquid, connections between the radiator and the container and pump to form a path for the circulation of the liquid therethrough, means for controlling the flow of the liquid through the container in parallel with the normal circulating cooling system of the engine, said container being visually examinable for observing the amount of liquid therein, another connection connecting the container with the intake manifold of the engine for producing a vacuum action in the system and facilitating the operation of the system in the circulation of the liquid therethrough, means for controlling the last mentioned connection, another connection from the container to the breathing cap of the engine for enabling vapors therefrom to be brought to the container and distributed thereby, and to said intake connection to be absorbed in the combustion chambers of the engine.

6. A cooling system for an internal combustion engine including a radiator and pump and using a circulating liquid coolant, comprising in combination, a container of predetermined capacity for holding a portion of the liquid, connections between the radiator and the container and pump to form a path for the circulation of the liquid therethrough, means for controlling the flow of the liquid through the container in parallel with the normal circulating cooling system of the engine, said container being visually examinable for observing the amount of liquid therein, another connection connecting the container with the intake manifold of the engine for producing a vacuum action in the system and facilitating the operation of the system in the circulation of the liquid therethrough, means for controlling the last mentioned connection, another connection from the container to the breathing cap of the engine for enabling vapors therefrom to be brought to the container and distributed thereby, to said intake connection to be absorbed in the combustion chambers of the engine, and an auxiliary radiator included in the first mentioned connections for adding to the cooling area of said system.

7. A cooling system for an internal combustion engine including a radiator and pump and using a circulating liquid coolant, comprising in combination, a container of predetermined capacity, for holding a portion of the liquid, connections between the radiator and the container and pump to form a path for the circulation of the liquid therethrough, means for controlling the flow of the liquid through the container in parallel with the normal circulating cooling system of the engine, said container being visually examinable for observing the amount of liquid therein, another connection connecting the container with the intake manifold of the engine for producing a vacuum action in the system and facilitating the operation of the system in the circulation of the liquid therethrough, means for controlling the last mentioned connection, another connection from the container to the breathing cap of the engine for enabling vapors therefrom to be brought to the container and distributed thereby, to said intake connection to be absorbed in the combustion chambers of the engine, an auxiliary radiator included in the first mentioned connections for adding to the cooling area of said system, and another connection for by-passing the liquid from the pump to one of the hoses to the first mentioned radiator.

8. A cooling system for an internal combustion engine including a radiator and pump and using a circulating liquid coolant, comprising in combination, a container of predetermined capacity for holding portion of the liquid, connections between the radiator and the container and pump to form a path for the circulation of the liquid therethrough, means for controlling the flow of the liquid through the container in parallel with the normal circulating cooling system of the engine, said container being visually examinable for observing the amount of liquid therein, another connection connecting the container with the intake manifold of the engine for producing a vacuum action in the system and facilitating the operation of the system in the circulation of the liquid therethrough, means for controlling the last mentioned connection, another connection from the container to the breathing cap of the engine for enabling vapors therefrom to be brought to the container and distributed thereby, to said intake connection to be absorbed in the combustion chambers of the engine, an auxiliary radiator included in the first mentioned connections for adding to the cooling area of said system, another connection for by-passing the liquid from the pump to one of the hoses to the first mentioned radiator, said container being arranged for coupling to said connections, and holding them at predetermined depths in it and providing means for indicating the position of the liquid in the container.

9. A cooling system for an internal combustion engine including a radiator and pump and using a circulating liquid coolant, comprising in combination, a container of predetermined capacity, for holding a portion of the liquid, connections between the radiator and the container and pump to form a path for the circulation of the liquid therethrough, means for controlling the flow of the liquid through the container in parallel with the normal circulating cooling system of the engine, said container being visually examinable for observing the amount of liquid therein, another connection connecting the container with the intake manifold of the engine for producing a vacuum action in the system and facilitating the operation of the system in the circulation of the liquid therethrough, means for controlling the last mentioned connection, another connection from the container to the breathing cap of the engine for enabling vapors therefrom to be brought to the container and distributed thereby, to said intake connection to be absorbed in the combustion chambers of the engine, an auxiliary radiator included in the first mentioned connections for adding to the cooling area of said system, another connection for by-passing the liquid from the pump to one of the hoses to the first mentioned radiator, said container being arranged for coupling to said connections, and holding them at predetermined depths in it and providing means for indicating the position of the liquid in the container, and baffles in the container for reducing splashing therein, and means in the container for filtering the liquid passing therethrough.

References Cited in the file of this patent

UNITED STATES PATENTS

| Number | Name | Date |
|---|---|---|
| 1,608,600 | Howe | Nov. 30, 1926 |
| 1,927,317 | Lloyd et al. | Sept. 19, 1933 |